US008936036B2

(12) United States Patent
Parsons

(10) Patent No.: US 8,936,036 B2
(45) Date of Patent: Jan. 20, 2015

(54) FLAP DOOR HAVING A SOFT HINGE FOR A HUNTING BLIND

(71) Applicant: Timothy Parsons, Novato, CA (US)

(72) Inventor: Timothy Parsons, Novato, CA (US)

( * ) Notice: Subject to any disclaimer, the term of this patent is extended or adjusted under 35 U.S.C. 154(b) by 0 days.

(21) Appl. No.: 13/888,245

(22) Filed: May 6, 2013

(65) Prior Publication Data

US 2013/0291916 A1    Nov. 7, 2013

Related U.S. Application Data

(60) Provisional application No. 61/643,157, filed on May 4, 2012.

(51) Int. Cl.
  *E04H 15/58*    (2006.01)
  *E04H 15/00*    (2006.01)
  *A01M 31/02*    (2006.01)

(52) U.S. Cl.
  CPC .............. *E04H 15/58* (2013.01); *E04H 15/001* (2013.01); *A01M 31/025* (2013.01); *Y10S 135/901* (2013.01)
  USPC ........................................... 135/117; 135/901

(58) Field of Classification Search
  CPC ..... E04H 15/58; E04H 15/001; A01M 31/025
  USPC .............................. 135/115, 117, 901; 43/1–3
  See application file for complete search history.

(56) References Cited

U.S. PATENT DOCUMENTS

| 4,751,936 | A | * | 6/1988 | Zibble et al. ................... 135/117 |
| 5,009,189 | A | * | 4/1991 | Neff ............................... 119/200 |
| 5,647,159 | A | * | 7/1997 | Latschaw ............................ 43/1 |
| 5,822,906 | A | * | 10/1998 | Ward ................................. 43/1 |
| 6,694,995 | B1 | * | 2/2004 | Ransom ......................... 135/128 |
| 6,698,131 | B2 | * | 3/2004 | Latschaw ............................ 43/1 |
| 7,237,283 | B2 | * | 7/2007 | Devries ............................ 5/419 |
| 7,549,434 | B2 | * | 6/2009 | Bean ............................. 135/143 |
| 8,342,348 | B2 | * | 1/2013 | Lin ................................ 220/9.4 |
| 8,365,752 | B1 | * | 2/2013 | Fortin ............................ 135/148 |
| 8,381,750 | B2 | * | 2/2013 | Desouches et al. ........... 135/115 |
| 2004/0231221 | A1 | * | 11/2004 | Latschaw ............................ 43/1 |

* cited by examiner

*Primary Examiner* — Noah Chandler Hawk
(74) *Attorney, Agent, or Firm* — Brian Beverly; Beeson Skinner Beverly, LLP

(57) ABSTRACT

A flap door having a soft hinge for a lay-down hunting blind comprises a fabric door frame cover, a door frame receiving pocket formed in the door frame cover, a door frame enclosed within the door frame receiving pocket supporting the door frame cover in planar configuration, the door frame having interconnected U-shaped head end and toe end support members having curved head end and toe end hinge corners supported on the framework of the hunting blind's enclosure, a hinge end of the door frame cover attached to one of two opposing lateral edges of the top opening of the fabric enclosure of the blind without any direct mechanical interconnection between the door frame and the support framework of the enclosure such that a pair of flap doors may be moved between opened and closed configurations over the top opening.

9 Claims, 10 Drawing Sheets

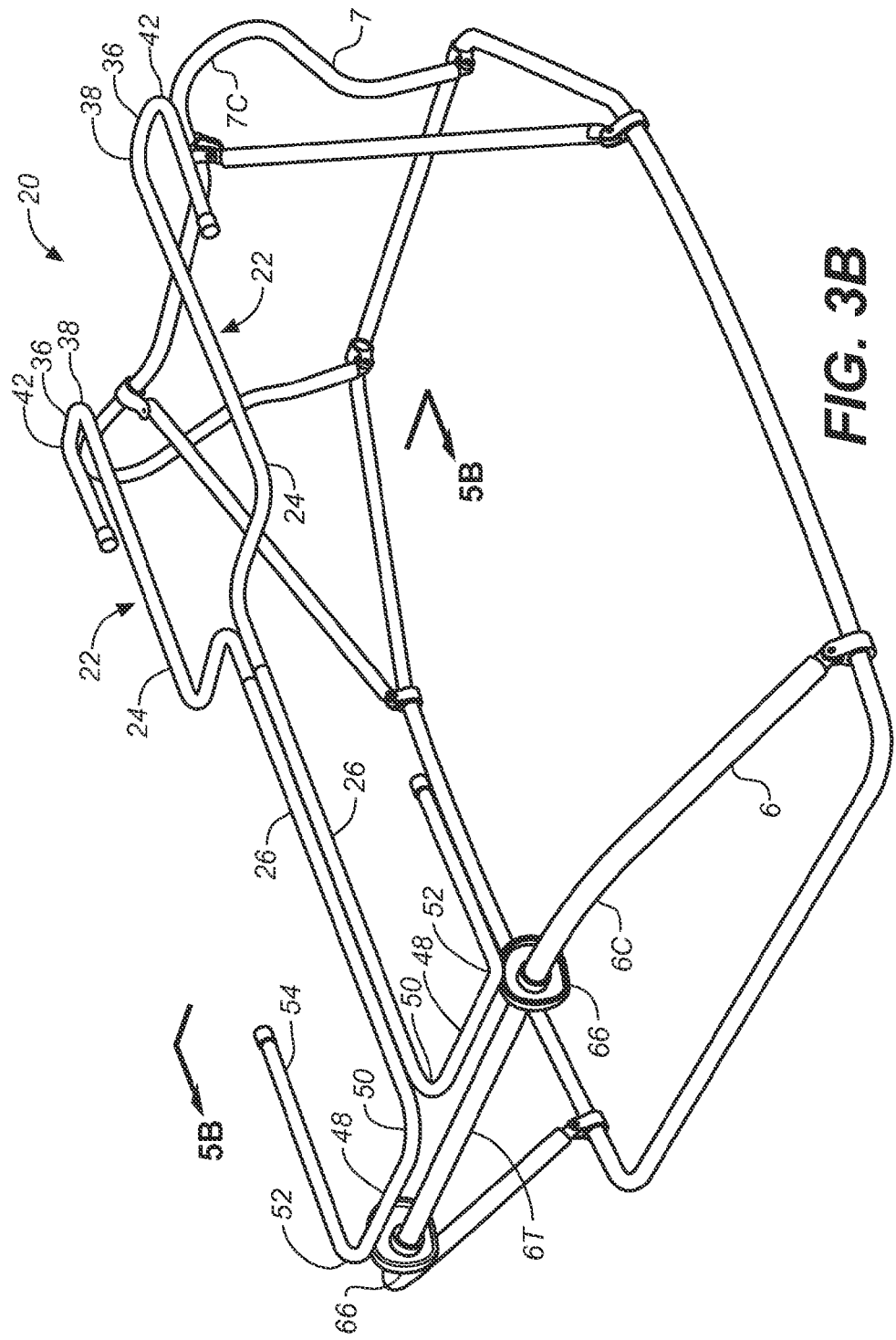

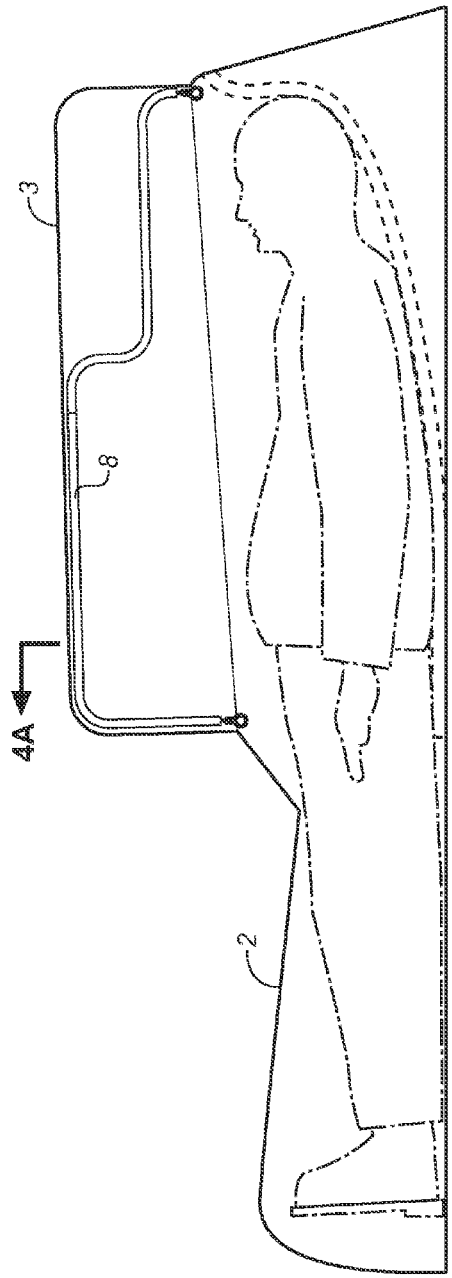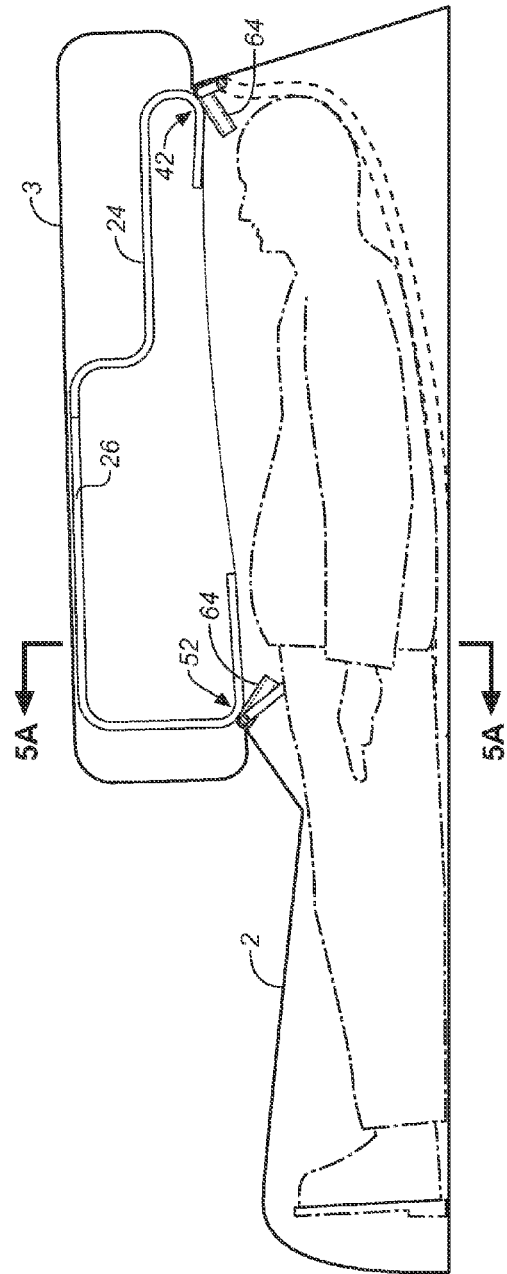

FLAP DOOR HAVING A SOFT HINGE FOR A HUNTING BLIND

CROSS-REFERENCE TO RELATED APPLICATIONS

This application claims the benefit of U.S. Provisional Application No. 61/643,157 filed May 4, 2012.

BACKGROUND

1. Field of the Invention

This invention relates to a door hinge for a hunting blind, and particularly to a flap door having a fabric hinge for a portable lay-down type hunting blind that is assembled on-site.

2. Description of the Prior Art

Lay-down type hunting blinds are widely used by waterfowl hunters. This type of hunting blind is readily portable, easy to set up in a relatively flat location, and permits the occupant to assume an inconspicuous recumbent position in the blind. With reference to FIGS. 1A and 1B, as deployed in the field a lay-down blind 2 has an elongated configuration forming an enclosure which is usually covered with camouflaging material. A pair of cooperating longitudinal flap doors 3 on the top side of the blind affords access through a top opening 18 to the enclosure's interior. While in the blind with its doors closed, an occupant is effectively concealed from view. When an object of interest approaches, the occupant can throw open the flap doors using his or her hands, arms and shoulders, abruptly sit up, and take appropriate action as needed.

A conventional lay-down blind 2 is a collapsible soft-sided blind that can be assembled on location in a field site and collapsed for storage purposes when not in use. As shown in FIG. 2A, in an assembled configuration, an internal support framework 4 holds the blind 2 in the form of an elongated enclosure appropriate for accommodating an occupant in a recumbent position. The doors are capable of being pushed open, as shown in FIG. 1A, or closed in an overlapping configuration across the center of the blind, as shown in FIG. 1B.

As seen in FIG. 2A, the support framework 4 is comprised of a substantially rectangular base 5 and U-shaped head and toe support brackets 7 and 6 to which identical door framework members 8 are connected via mechanical hinge joints 9. Stabilizing bars 10 interconnect base 5 and head bracket 7 to secure the latter in position. The door frame members 8 can be pivoted about hinge joints 9 from an open position, shown in FIG. 2A, to a closed position, shown in FIG. 2B. The support framework 4 is covered in a fabric material to form a fabric enclosure 17 which may be imprinted with a camouflaging pattern.

Each hinge typically consists of a clevis member 11 having pin holes 12 through both ends 13 thereof. See FIG. 2C. A cooperating insert member 14, having a matching pin hole 15, is inserted between the ends of the clevis and a pivot pin 16 is inserted in the pin holes 12, 15 of the clevis member 11 and the insert member 14 so that each part is rotatable with respect to the other about the pivot pin 16. See also FIGS. 4A, 4B, and 6.

One limitation of the prior art mechanical hinge 9 is that a substantial amount of force and dexterity can be required to maneuver the component parts and the hinge pin into place when assembling the hunting blind. As the blinds are often set up in the field in cold or otherwise adverse weather conditions during the early morning hours, the process can be difficult and frustrating. A second limitation is that the pins for assembling the door hinge can easily be misplaced or lost when the hunting blind is being collapsed into its component parts for storage or while being transported.

Thus, there is a need for an improved hinge for the flap doors of a lay-down type hunting blind that is easy to assemble and requires manipulation of fewer small parts.

BRIEF DESCRIPTION OF THE ILLUSTRATIONS

FIG. 3B is a left side perspective view of the framework of the hunting blind shown in FIG. 3A, showing the door frame members in a closed position.

FIG. 6A is a sectional view of the prior art hunting blind shown in FIG. 2A taken along lines 6A-6A thereof showing the flap doors in an open position.

FIG. 6B is a sectional view of a hunting blind according to the invention showing the door frame members of the flap doors when in a open position in a view taken along lines 6B-6B of FIG. 3A.

DESCRIPTION OF THE ILLUSTRATED EMBODIMENT

Figure 1A:
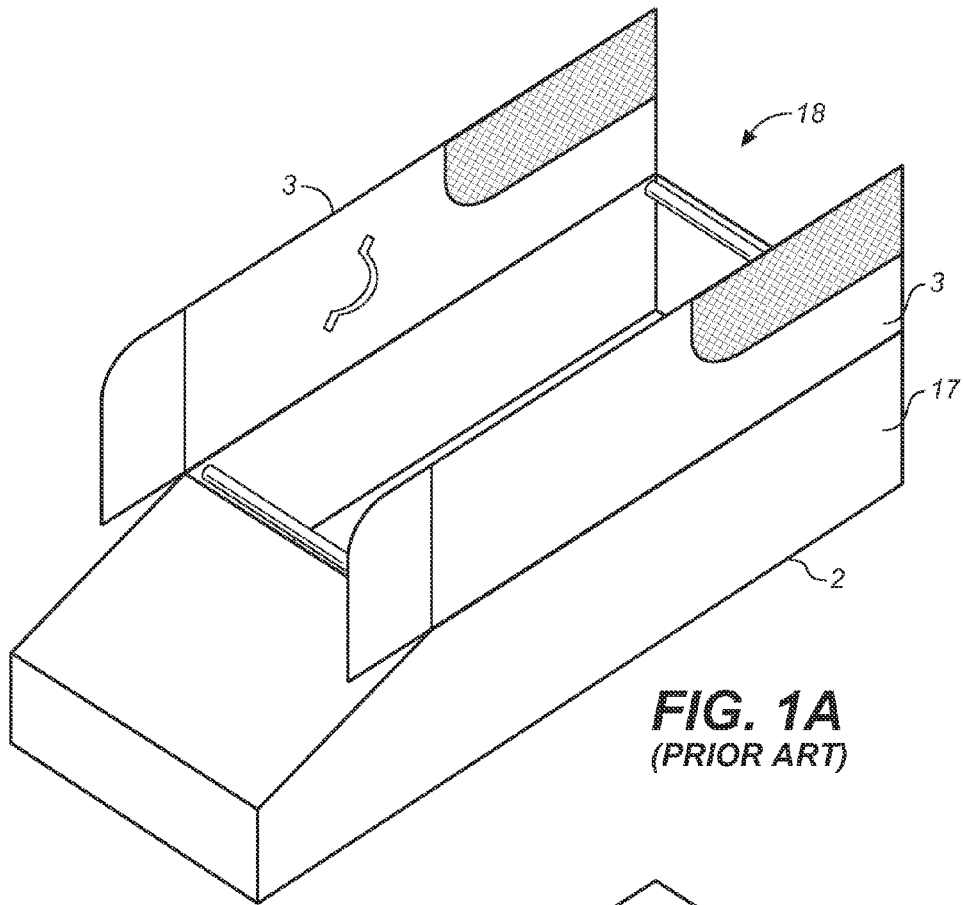
FIG. 1A is a top perspective view of a prior art lay-down type hunting blind showing the flap doors in an open position.
Figure 1B:
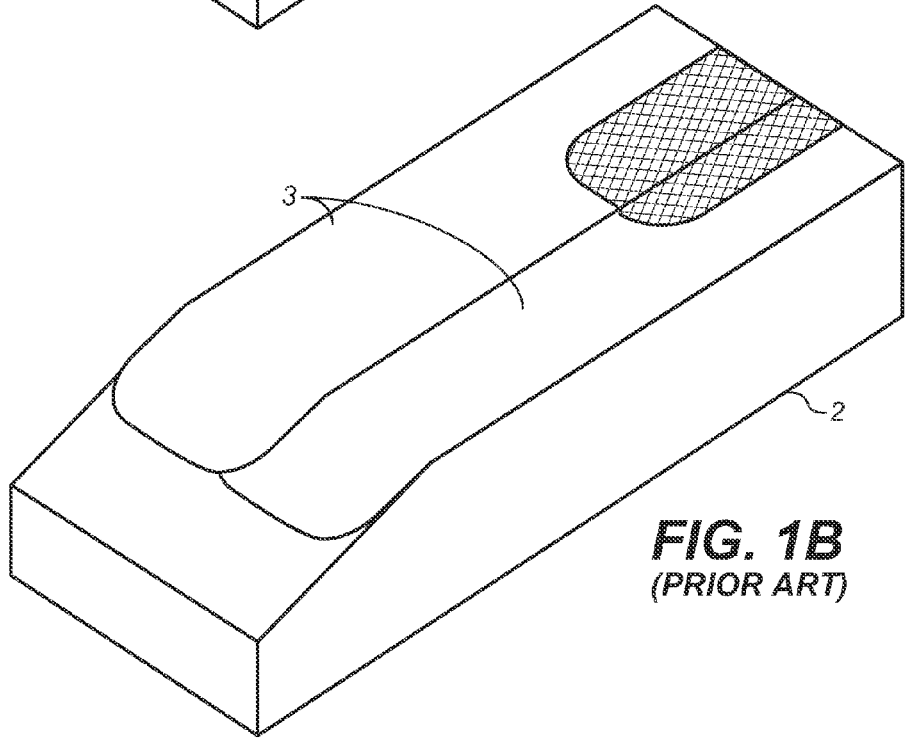
FIG. 1B is a top perspective view of a prior art lay-down hunting blind showing the flap doors in a closed position.
Figure 2A:
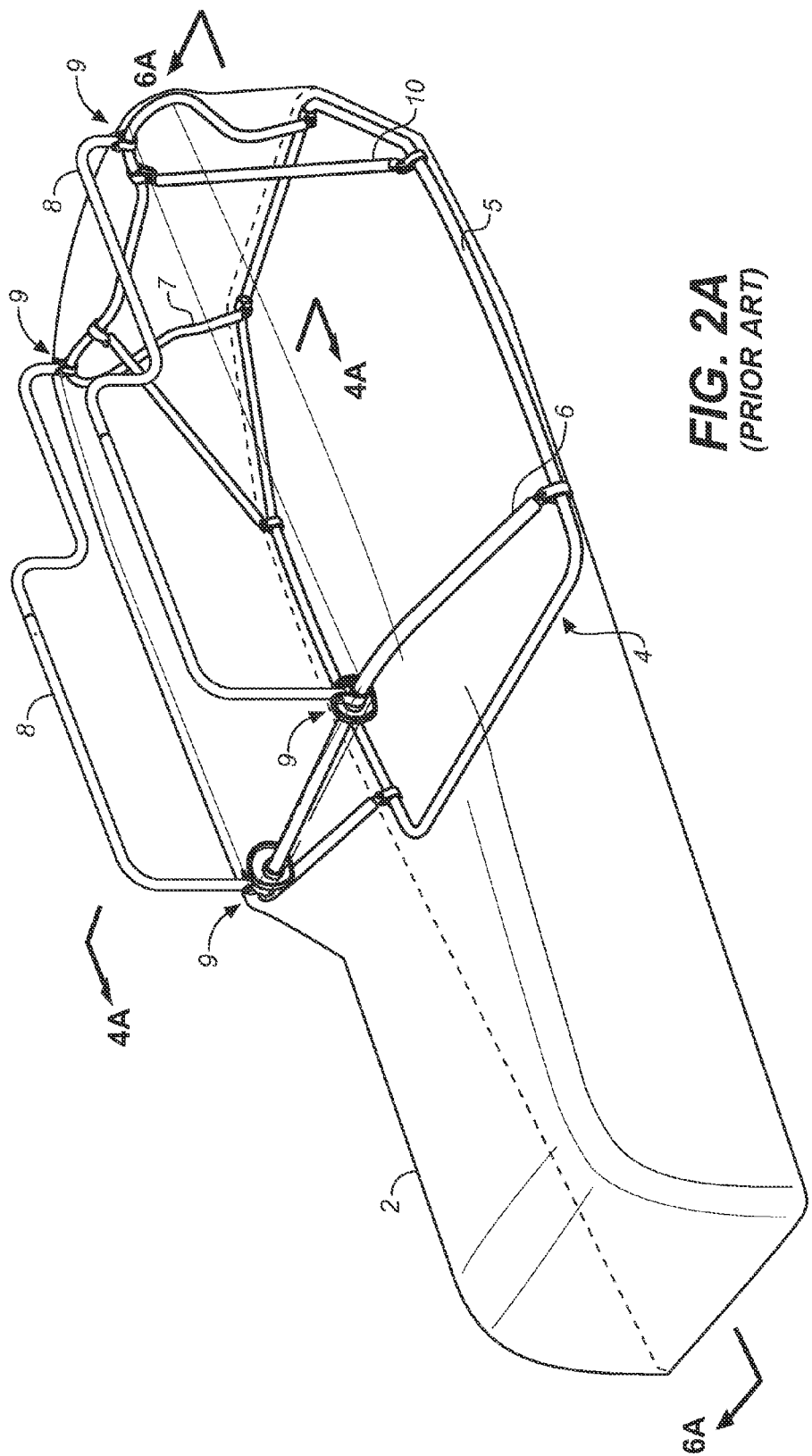
FIG. 2A is a left side perspective view of a prior art hunting blind with the doors in a open position, and showing the hunting blind covering material in phantom lines to reveal the framework members of the base portion and the flap doors in an open position.
Figure 2B:
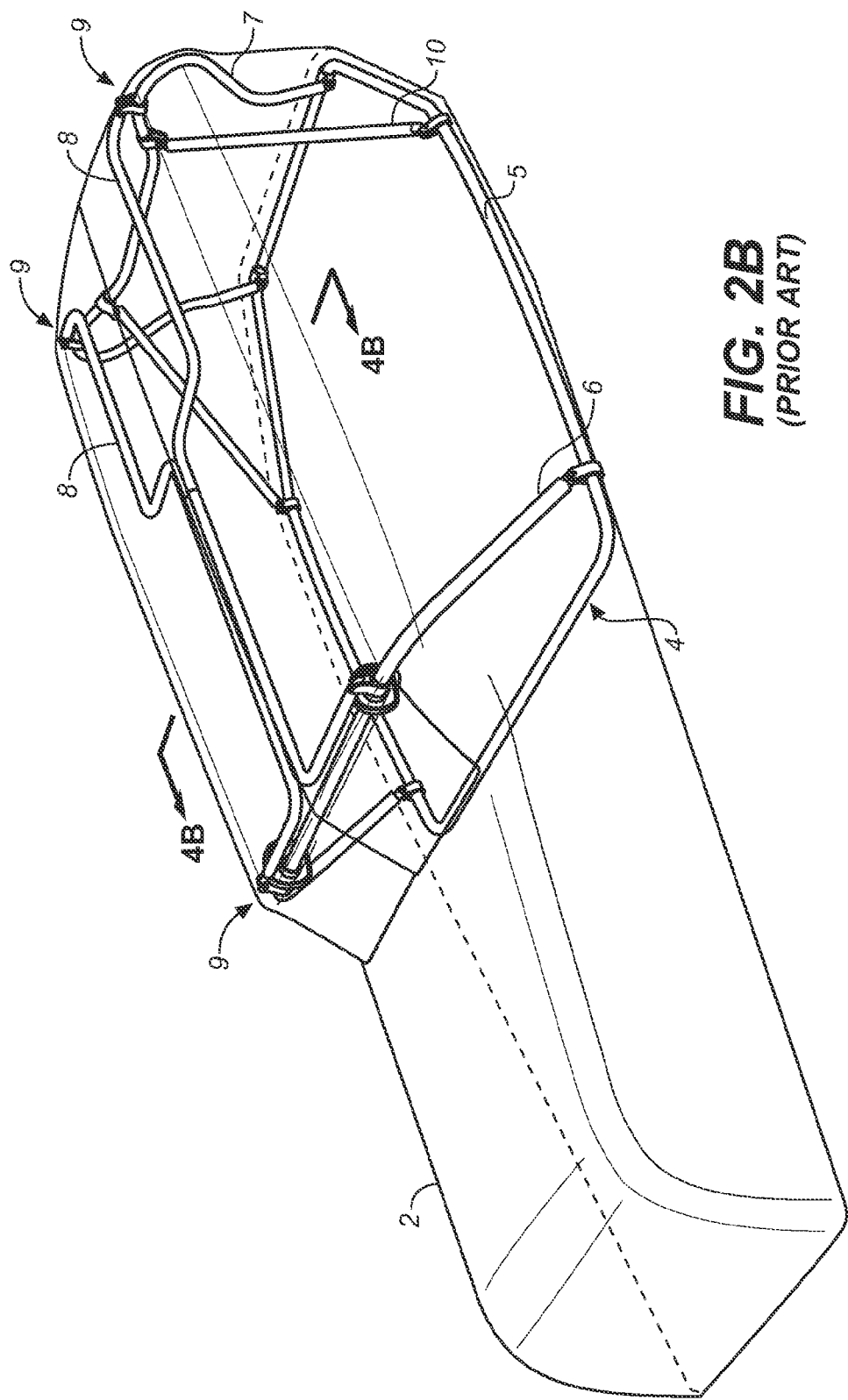
FIG. 2B is a left side perspective view of the prior art hunting blind similar to FIG. 2A, but showing the doors in a closed position.
Figure 2C:
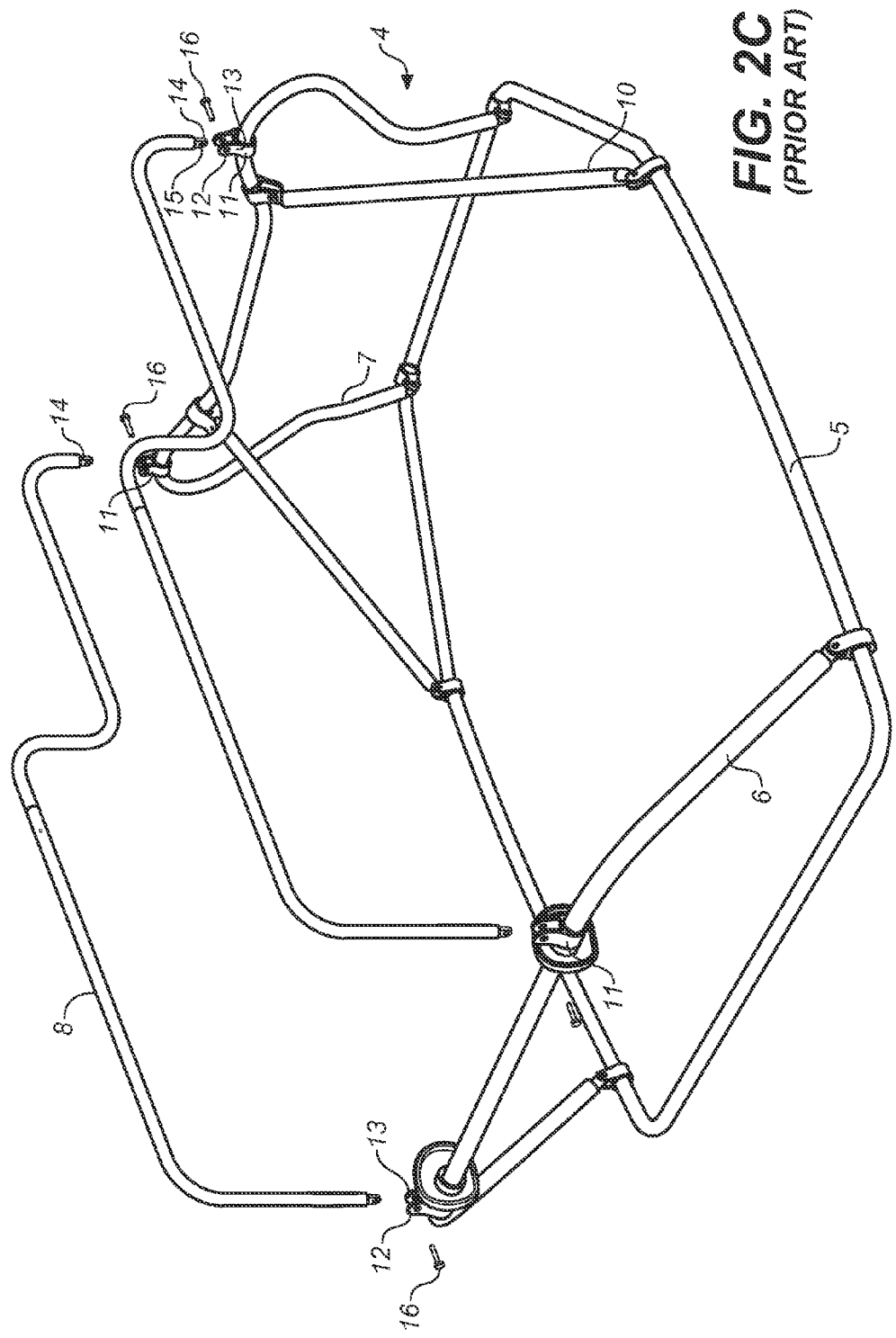
FIG. 2C is an exploded left side perspective view of the prior art framework members for the hunting blind shown in FIGS. 2A and 2B.
Figure 3A:
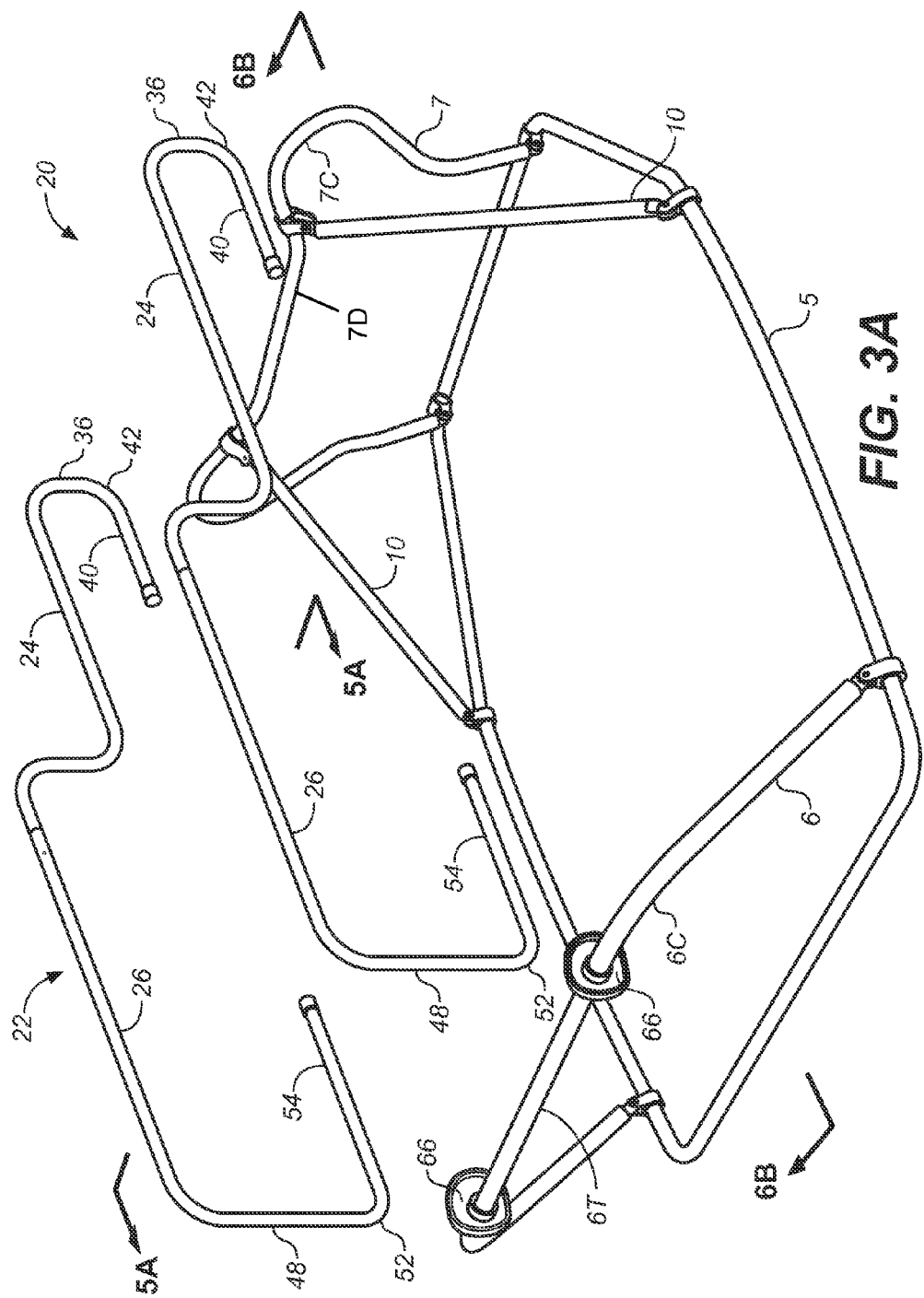
FIG. 3A is an exploded left side perspective view of the framework for a hunting blind, similar to FIG. 2C, but showing the new base and door frame members in accordance with the invention.

A flap door having a soft hinge for a lay-down hunting blind, referred to generally at 20 in FIGS. 3A and 3B, completely eliminates the mechanical hinge 9 discussed above. Applicants' soft hinge 20 utilizes the base framework members of the prior art blind including rectangular base 5, head and toe support brackets 7 and 6, and stabilizing bars 10. While the framework members as shown in the illustrated embodiment are tubular bars, in alternate embodiments the framework members may have differently shaped cross-sectional profiles. With additional reference to FIG. 3C, door frames 22 comprise a head end member 24 and a toe end member 26. Although in the illustrated embodiment each door frame comprises separate head end and toe end members 24, 26, those of skill in the art will understand that the frame member could be constructed of a single frame member having head end and toe end portions. The head end and toe end members are assembled by inserting projection 28 into a receiving bore (not shown) in the toe end member 26, the receiving bore having a diameter slightly larger than the projection 28 for a snug fit, as indicated by the dotted lines in FIG. 3C. The projection 28 is then oriented in the receiving bore until a detent ball 30 on the projection 28 snaps into an aperture 32 of corresponding size to secure the parts together and oriented in a planar configuration.

The head end member 24 includes a longitudinally extending head end member spine section 34 and a laterally extending head end cross bar 36 connected to the spine 34 by curved corner section 38. However, instead of leading to a hinge as in the prior art, head end member 24 has a longitudinally extending head end reversing arm 40 disposed generally parallel to spine 34 and interconnected with the head end cross bar 36 by curved head end hinge corner 42. Since the framework is usually constructed of metal tubing, a cap 44 is provided on the end of the head end reversing arm 40 to cover any sharp surfaces.

Figure 3C:
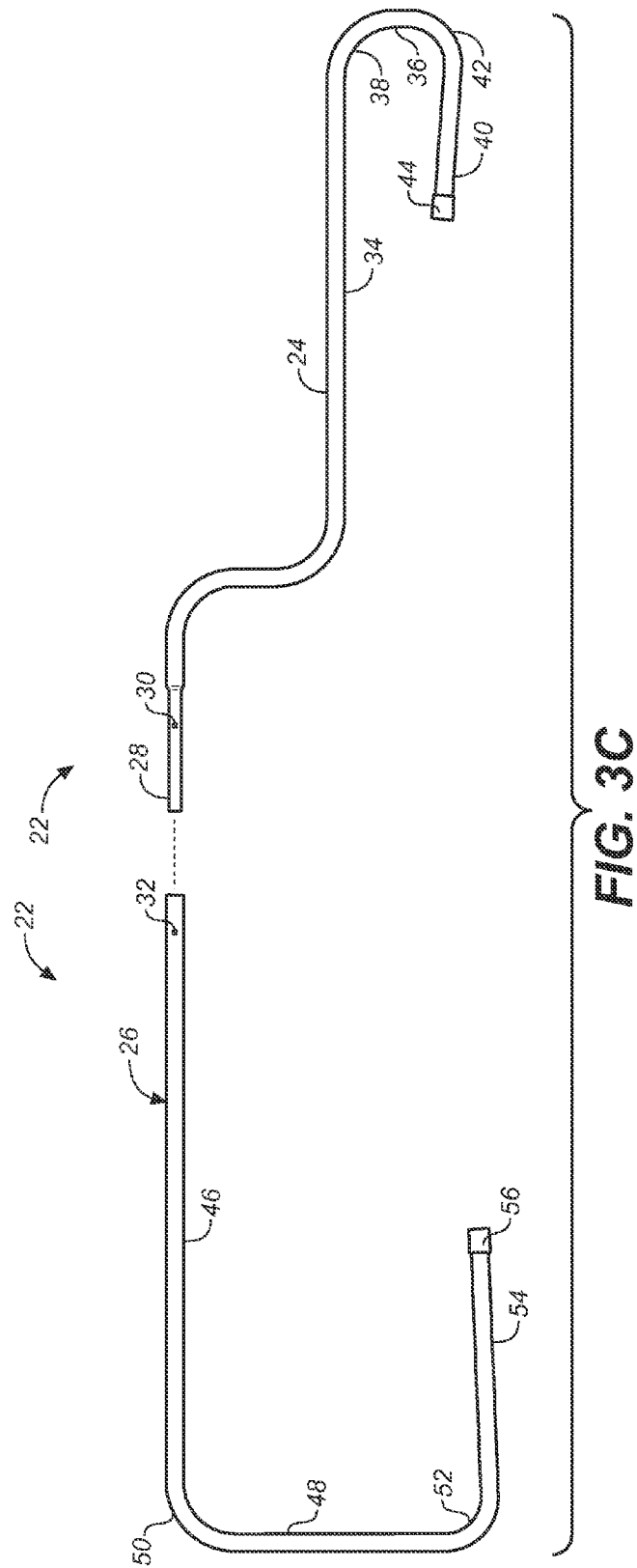
FIG. 3C is an exploded side elevational view of the door frame members of the hunting blind shown in FIGS. 3A and 3B.
Figure 4A:
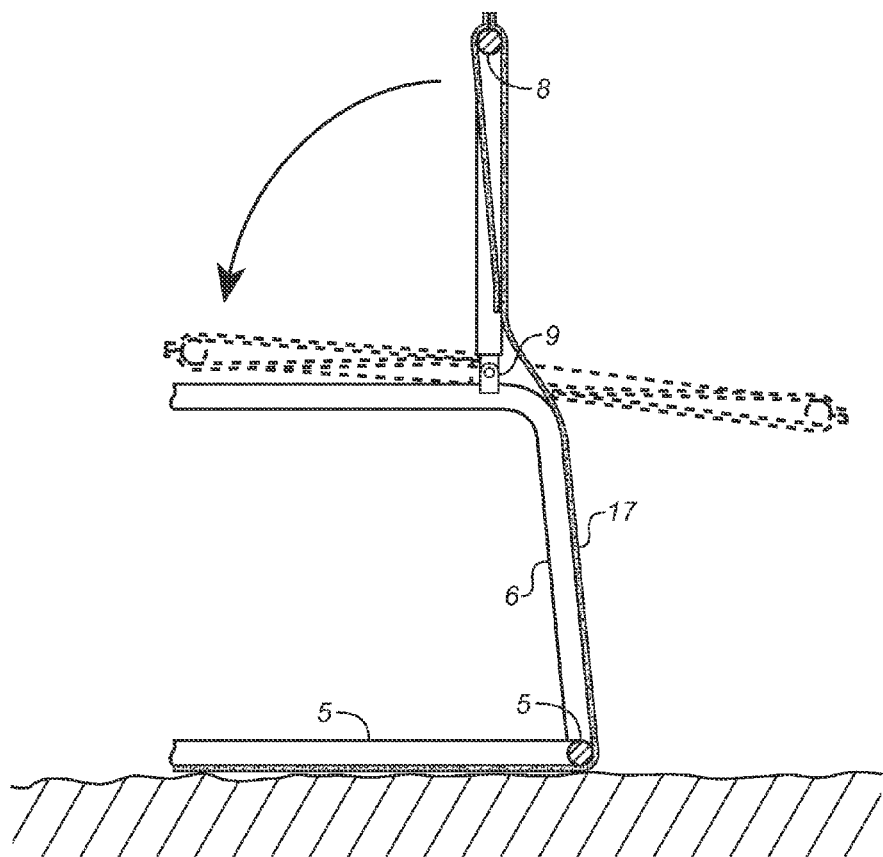
FIG. 4A is of a sectional elevation view of the flap doors of the hunting blind shown in FIG. 2A and FIG. 6A taken along lines 4A-4A of FIG. 6A, the dotted lines showing the door in closed and open positions.
Figure 4B:
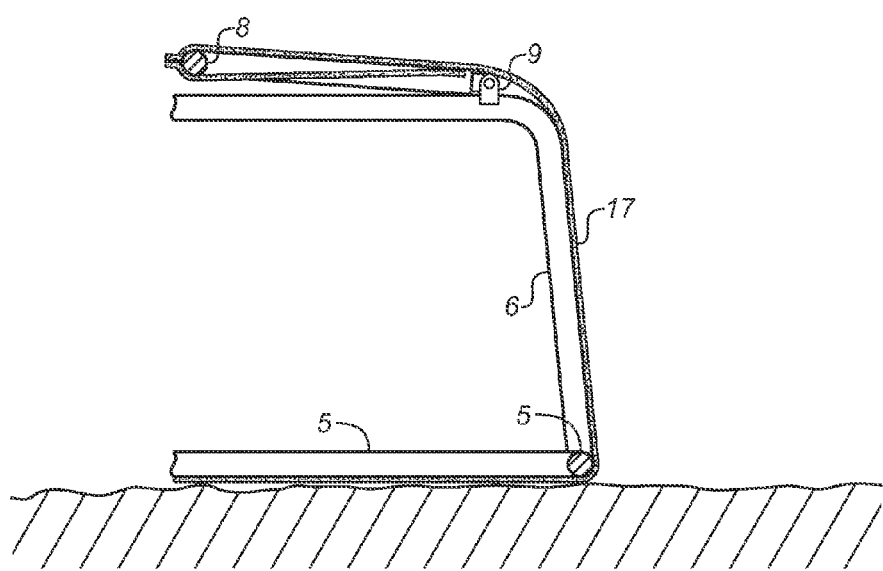
FIG. 4B is a sectional view of the frame of the hunting blind shown in FIG. 2B taken along lines 4B-4B.

The toe end member 26 includes a longitudinally extending toe end member spine section 46, a laterally extending toe end cross bar 48 interconnected by a curved free corner 50. Like the head end member 24, the laterally extending toe end cross bar 48, instead of terminating in a hinge, leads into a curved toe end hinge corner 52 which extends into longitudinally extending toe end reversing arm 54. Base bar 54 is disposed generally parallel to toe end member spine section 46 and projects towards head end reversing arm 40 as seen in FIG. 3C. A protective cap 56 is provided on the end of outer bar 46. Head end and toe end reversing arms 40, 54 are spaced apart as shown, but could be interconnected in another embodiment.

Figure 5A:
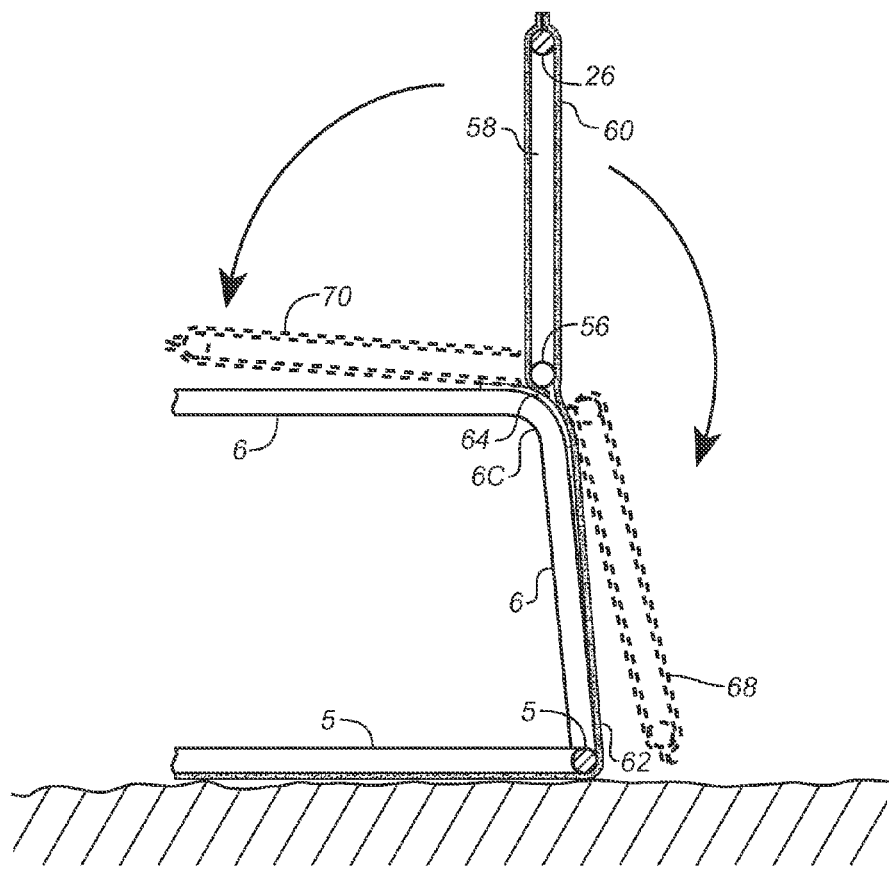
FIG. 5A is a sectional view of the frame of the hunting blind shown in FIG. 3A and FIG. 6B taken along lines 5A-5A of FIG. 6B; the dotted lines showing the door in closed and open positions reflect the full range of motion of the doors according to the invention.
Figure 5B:
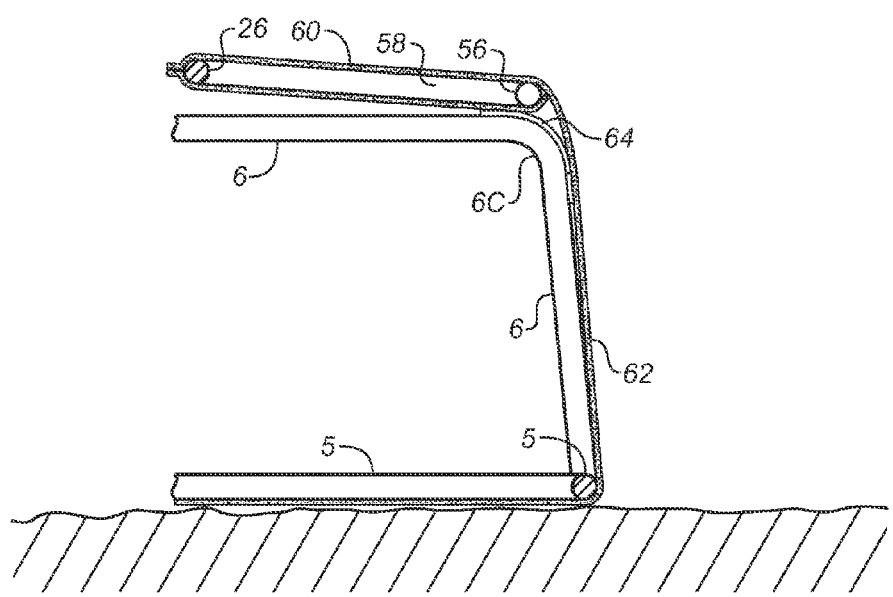
FIG. 5B is a sectional view of the frame of the hunting blind shown in FIG. 3B taken along lines 5B-5B thereof.

Once the door frames 22 are assembled, they are inserted into and tightly contained in door frame receiving pockets 58 formed in the fabric door frame covers 60 as shown in FIGS. 5A and 5B. Each door frame cover 60 is attached to the material forming the sides 62 of the enclosure. As will be readily understood with reference again to FIGS. 1A, 1B, 2A and 2B, the material surrounding and forming the enclosure is stretched and under tension when the enclosure's support framework 4 is assembled. Since the material forming a hunting blind is generally constructed from a very sturdy fabric, once the support framework 4 is erected to form the enclosure, the door frame material 60 is located precisely relative to the enclosure's support framework 4 thereby positioning the door frames 22 adjacent to the top opening 18 of the enclosure's framework 4. In particular, as best seen in FIG. 3B, toe end cross bar 48 is disposed over toe bracket 6 and head end cross bar 36 is disposed over head bracket 7. The flap doors of the blind are thus supported by the support framework 4 of the enclosure and are foldable, as indicated by the arrows in FIG. 5A, with respect to the sides 62 of the enclosure from open to closed positions 68, 70.

In the illustrated embodiment, the head end and toe end hinge corners 42, 52 rest on and are supported by the curved shoulders 7C of the top bar 7D of head bracket 7 and the curved upper corners 6C of toe bracket 6, as seen in FIGS. 3A, 3B, 5A and 5B. Thus, as the doors pivot from open to closed positions, the curved hinge corners 42, 52 of each flap door are continually supported by the shoulders 7C of head bracket 7 and the upper corners 6C of toe bracket 6 thereby minimizing wear-and-tear on the fabric interposed between door framework members 22 and on the head and toe brackets 7, 6 by the elimination of sharp surfaces at the junctures of rotation.

In one aspect of the invention, a reinforcing strip 64 is provided at the corners of the top opening of the enclosure to strengthen them. See FIG. 6B. The reinforced corners guard against slippage of the enclosure material and help ensure proper positioning of the flap doors 3 and, hence, door frames 22, over the head and toe brackets 7, 6 of the support framework 4. Tearing of the corners of the top opening of the enclosure from repeated opening and closing of the flap doors 3 is therefore avoided.

In another aspect of the invention, rotatable cam spacers 66 are provided on the toe support bracket 6 to enable adjustment of the spacing between the flap doors and the base framework 4 as seen in FIGS. 3A and 3B. The cam spacers 66 can be slid lengthwise along and are rotatable around transverse bar 6T of toe support bracket 6. The radial distance between the transverse bar 6T and the outer surface of each of the cam spacers 66 varies around the circumference of the cam spacer 66. Thus, by rotating the cam spacer 66 on the transverse bar 6T, a desired radial distance may be selected in a vertical direction. Since the cross bar 48 of the door framework member 22 rests on the cam spacer 66, varying the radial distance from the cross bar 6T establishes the angle at which the flap door 3 is disposed relative to the transverse bar 6T when resting on the cam spacer 66. It will also be seen that moving the cam spacer 66 closer toward the corner 6C of the toe support bracket will increase the angle of the flap door 3 relative to the transverse bar 6T and moving the cam spacer 66 toward the middle of the transverse bar 6T will decrease the angle.

There have thus been described certain preferred embodiments of a soft flap door hinge for a hunting blind. While preferred embodiments have been described and disclosed, it will be recognized by those with skill in the art that modifications are within the true spirit and scope of the invention.

I claim:

1. A flap door having a soft hinge for a lay-down hunting blind having an elongated fabric enclosure supported by a rigid framework, the framework having an assembled configuration for holding the enclosure in an elongated form sized for accommodating an occupant in a recumbent position and a top opening providing access to the interior thereof, said top opening including two opposing lateral edges, the flap door having a soft hinge comprising:

the framework including a U-shaped head bracket and a U-shaped toe bracket, said head bracket having a laterally extending top bar including a pair of oppositely disposed shoulders, and said toe bracket having a laterally extending transverse bar including a pair of oppositely disposed upper corners, a pair of flap doors each having a fabric door frame cover including a longitudinally extending hinge side, a head end and a toe end opposite said head end, each door frame cover hingedly attached along said hinge side to one of the lateral edges of the enclosure of the hunting blind at the top opening thereof, each door frame cover forming a door frame receiving pocket, and a pair of longitudinally extending door frames, each of said pair of door frames having a U-shaped head end support member and a U-shaped toe end support member interconnected with said head end support member, each of said pair of door frames fully enclosed within the pocket of one of said pair of door frame covers with said head end support member disposed at the head end of said door frame cover and said toe end support member disposed at the toe end of said door frame cover, such that each of said pair of door frame covers is supported in a planar configuration, wherein said pair of door frames are held adjacent to said head and toe brackets by the fabric enclosure, such that the head end support members of said door frames are disposed on and supported by the shoulders of said head bracket, and the toe end support members of said door frames are disposed on and supported by the upper corners of said toe bracket, so that said pair of flap doors is movable about the hinge side of each of said pair of door frame covers between an open configuration and a closed configuration without any direct mechanical connection between said pair of door frames and the rigid framework supporting the enclosure, said closed configuration for covering the top opening of the enclosure.

2. The flap door having a soft hinge of claim 1 wherein:
the head end support member of each of said pair of door frames includes a head end hinge corner, the toe end support member of each of said pair of door frames includes a toe end hinge corner, and said head end hinge corners are supported on the shoulders of the head bracket of said framework, and said toe end hinge corners are supported on the upper corners of the toe bracket of said framework.

3. The flap door having a soft hinge of claim 1, the top opening including a head edge and a toe edge, the framework having a head bracket supporting the head edge and a toe bracket supporting the toe edge, wherein:
said head end and toe end hinge corners are disposed adjacent the hinge side of the door frame covers of each of said pair of flap doors,
said head end hinge corner is supported on the head bracket of said framework, and
said toe end hinge corner is supported on the toe bracket of said framework,
such that during movement between said opened and closed configurations, said head end and toe end hinge corners remain supported by said head and toe brackets.

4. The flap door having a soft hinge of claim 1 wherein:
the head end and toe end support members of each of said pair of door frames comprise tubular bars,
the door frame cover of each of said pair of flap doors has a free side opposite said hinge side, and
each of said door frames includes a tubular spine member extending between said head end and toe end support members, said spine member disposed adjacent and supporting the free side of said door frame cover.

5. The flap door having a soft hinge of claim 1 wherein:
each of said pair of door frames includes a head end member and a toe member detachably attached to said head end member.

6. The flap door having a soft hinge according to claim 1 wherein:
the head bracket and toe bracket each comprise tubular bars.

7. The flap door having a soft hinge according to claim 1 wherein:
the head end support member of each of said pair of door frames includes a head end hinge corner,
the toe end support member of each of said pair of door frames includes a toe end hinge corner, each of said pair of door frames is disposed in a plane parallel with the longitudinal dimension of the enclosure, and
said head bracket and said toe bracket each comprise rigid bars disposed in a plane generally perpendicular to the longitudinal dimension of the enclosure,
such that the head end hinge corners of said pair of door frames are supported on and in perpendicular relation to the shoulders of said head bracket, and the toe end hinge corners of said pair of door frames are supported on and in perpendicular relation to the upper corners of said toe bracket.

8. A flap door having a soft hinge for a lay-down hunting blind having an elongated fabric enclosure supported by a rigid framework, the framework having an assembled configuration for holding the enclosure in an elongated form sized for accommodating an occupant in a recumbent position and a top opening providing access to the interior thereof, said top opening including two opposing lateral edges, the flap door having a soft hinge comprising:
a pair of flap doors each having a fabric door frame cover including a longitudinally extending hinge side, a head end, and a toe end opposite said head end, each door frame cover hingedly attached along said hinge side to one of the lateral edges of the enclosure of the hunting blind at the top opening thereof, each door frame cover forming a door frame receiving pocket, and
a pair of door frames, each of said pair of door frames having a U-shaped head end support member and a U-shaped toe end support member interconnected with said head end support member, said head end support member having a laterally extending head end cross bar and a longitudinally extending head end reversing arm, said toe end support member having a laterally extending toe end cross bar and a longitudinally extending toe end reversing arm, said head end and toe end reversing arms disposed along the hinge side of each of the door frame covers and having spaced apart free ends, each of said pair of door frames fully enclosed within the pocket of one of said pair of door frame covers with said head end support member disposed at the head end of said door frame cover and said toe end support member disposed at the toe end of said door frame cover, such that each of said pair of door frame covers is supported in a planar configuration,
wherein said pair of flap doors is movable about the hinge side of each of said pair of door frame covers between an open configuration and a closed configuration without any direct mechanical connection between said pair of door frames and the rigid framework supporting the enclosure, said closed configuration for covering the top opening of the enclosure.

9. A flap door having a soft hinge for a lay-down hunting blind having an elongated fabric enclosure supported by a rigid framework, the framework having an assembled configuration for holding the enclosure in an elongated form sized for accommodating an occupant in a recumbent position and a top opening providing access to the interior thereof, said top opening including two opposing lateral edges, the flap door having a soft hinge comprising:
the framework including a U-shaped head bracket and a U-shaped toe bracket each disposed in a plane generally perpendicular to the longitudinal dimension of the enclosure, said head bracket having a laterally extending top bar including a pair of oppositely disposed shoulders, and said toe bracket having a laterally extending transverse bar including a pair of oppositely disposed upper corners, a pair of flap doors each having a fabric door frame cover including a longitudinally extending hinge side, a head end and a toe end opposite said head end, each door frame cover hingedly attached along said hinge side to one of the lateral edges of the enclosure of the hunting blind at the top opening thereof, each door frame cover forming a door frame receiving pocket, and a pair of door frames disposed in a plane parallel with the longitudinal dimension of the enclosure, each of said pair of door frames having a U-shaped head end support member and a U-shaped toe end support member interconnected with said head end support member, said head end support member including a head end hinge corner and said toe end support member including a toe end hinge corner, each of said head end and toe end hinge corners comprising rigid bars, each of said pair of door frames fully enclosed within the pocket of one of said pair of door frame covers with said head end support member disposed at the head end of said door frame cover and said toe end support member disposed at the toe end of said door frame cover, such that each of said pair of door frame covers is supported in a planar configuration, wherein said pair of door frames are held adjacent to said head and toe brackets by the fabric enclosure, such that the head end hinge corners of said door frames are disposed on and supported in perpendicular relation thereto by the shoulders of said head bracket, and the toe end hinge corners of said door frames are disposed on and supported in perpendicular relation thereto by the upper corners of said toe bracket, so that said pair of flap doors is movable about the hinge side of each of said pair of door frame covers between an open configuration and a closed configuration without any direct mechanical connection between said pair of door frames and the rigid framework supporting the enclosure, said closed configuration for covering the top opening of the enclosure.

\* \* \* \* \*